United States Patent [19]

Nishijima et al.

[11] 4,066,001
[45] Jan. 3, 1978

[54] SKIVING CUTTER FOR USE IN CUTTING INTERNAL SPUR GEAR

[75] Inventors: Komio Nishijima, Komatsu; Masakazu Kojima, Kanazawa, both of Japan

[73] Assignee: Kabushiki Kaisha Komatsu Seisakusho, Tokyo, Japan

[21] Appl. No.: 707,269

[22] Filed: July 21, 1976

Related U.S. Application Data

[63] Continuation of Ser. No. 523,137, Nov. 12, 1974, abandoned.

[51] Int. Cl.² ............................ B26D 1/12; B23F 1/00
[52] U.S. Cl. ............................................. 90/3; 407/28
[58] Field of Search ................ 90/3; 29/103 R, 103 C

[56] References Cited

U.S. PATENT DOCUMENTS

| | | | |
|---|---|---|---|
| 1,809,868 | 6/1931 | Simmons | 29/103 C |
| 1,892,091 | 12/1932 | Wildhaber | 29/103 C |
| 1,913,865 | 6/1933 | Wildhaber | 29/103 C |
| 3,264,940 | 8/1966 | Wildhaber | 29/103 R |

OTHER PUBLICATIONS

Bulletin of the JSME, vol. 17, No. 106 of Apr. 1974-article entitled Gear Skiving of Internal Spur Gear, pp. 511-518.

*Primary Examiner*—Harrison L. Hinson
*Attorney, Agent, or Firm*—Armstrong, Nikaido & Marmelstein

[57] ABSTRACT

A skiving cutter for use in cutting an internal spur gear having a cutter body adapted to be mounted on a spindle extending from a cutter head. Cutting blades are formed thereon at a position offset from the intersection of the axis of the cutter and the axis of a work piece to be cut. Further, the contacting point between each cutting blade of the cutter and each gear tooth formed on the work piece is located within a contacting or acting region therebetween. Thus, the design value of the blade profile of the cutter may be selected to be near the lower limit of the contacting or acting region.

1 Claim, 6 Drawing Figures

SKIVING CUTTER FOR USE IN CUTTING INTERNAL SPUR GEAR

This is a continuation, of application Ser. No. 523,137, filed Nov. 12, 1974, now abandoned.

BACKGROUND OF THE INVENTION

1. Field of the Invention

This invention relates to a skiving cutter for use in cutting an internal spur gear.

2. Description of the Prior Art

For easier and better understanding of this invention, a conventional gear skiving or cutting process will be described below with reference to FIGS. 1 to 3 of the accompanying drawings.

As shown in FIGS. 1 and 2, a cutter gear having cutting blades "a" formed along the stagger axis, that is, helical pinion cutter "b" is used which is forcibly moved in the direction as indicated by the arrow as a fly cutter rotated within a vacant space for skiving the work peice "c" to be cut by the line of cutting blades thereof to form an internal spur gear. This work process is highly efficient, but since it has frequently caused the staggered contact between the cutter "b" and the work piece "c" to be cut, analyzed design procedures thereof were troublesome. Therefore, the analysis thereof were insufficient and unsatisfactory.

In order to achieve the sufficient skiving operation, an arrangement should be made such that the contacting point between one of cutting blades "a" and a work piece "c" to be cut is located at a pitch point P between the cutter and the workpiece to be cut. If the contacting point is located away from the pitch point P, the tooth profiles along the left and right sides formed on the work piece "c" become unsymmetrical, and thus an offset cutter could not be used. As a consequence, the effective width "l" of the cutter is limited by the side clearance angle $\delta$ thereof and so the number of regrinding cutting blades is limited as well.

Of late, the gear skiving or cutting process has been theoretically analyzed and an interference diagram as shown in FIG. 3 has been obtained based on the theoretical analysis values. In FIG. 3, reference characters $C_{1d}$ and $C_{1r}$ denote respective interference lines at the root and bottom of the teeth cut on the work piece "c" and $C_{2k}$ an interference line at the addendum of the cutter "b". The part encompassed by the interference lines $C_{1r}$, $C_{1d}$ and $C_{2k}$ or the region indicated by oblique lines is defined to be a contact or action region L. Therefore, it can be seen that if the gear is designed such that the contacting point between the cutting blades of the cutter "b" and the work piece "c" to be cut is located within the contact or action region L, it becomes possible to obtain an accurate symmetrical tooth profile along the left and right sides formed on the work piece "c" even though a design value Po of cutting blade profile of the cutter is offset downwards for the contacting point.

SUMMARY OF THE INVENTION

The present invention has been made taking into consideration the above-mentioned fact and has for its object to provide an skiving cutter for use in cutting an internal spur gear which enables the length of cutting blades of the skiving cutter to be larger than prior art blades thereby increasing the number of regrinding the cutter and reducing the cost of tools required per one gear being skived thereby and which enables the side clearance angle $\delta$ to be made smaller with a proper accuracy of the shape of teeth to be formed thereby being ensured.

DETAILED DESCRIPTION OF THE PREFERRED EMBODIMENT

The present invention will now be described hereinbelow in detail with reference to FIGS. 4 to 6 of the accompanying drawings.

Figure 1:
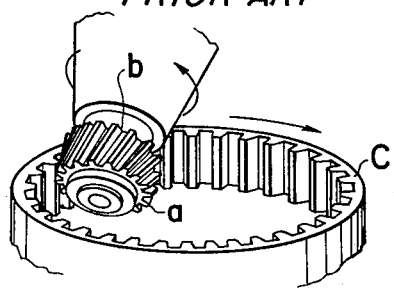
FIG. 1 is an illustrative arrangement of a conventional skiving cutter operating on a workpiece.
Figure 2:
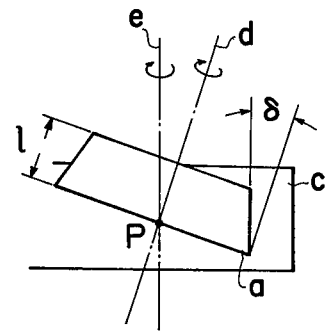
FIG. 2 is an explanatory view of the operation of the same.
Figure 3:
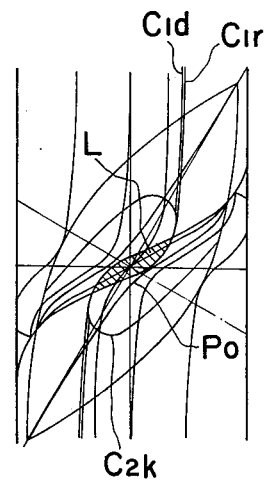
FIG. 3 is an interference diagram.

Reference numeral 1 represents a skiving cutter which has a hub 2 in which a main spindle 4 of a cutter head 3 is fixedly secured. The skiving cutter 1 has a body 7 including cutting blades 5. Each cutting blade 5 is formed such that the distal end thereof is located at a position offset by an amount of "m" downwards from the pitch point P between the cutter and the workpiece to be cut. The contacting point between the cutting blades 5 and the work piece 6 to be cut is located within a contact or action region L shown in FIG. 3. The side clearance angle $\delta$ is determined in accordance with the amount of offset m, and an extremely small side clearance angle is required for the skiving cutter 1. This is because if the distal end of each cutting blades 5 is shifted downwards from the pitch point and located within the contact or action region L shown in FIG. 6, no interference occurs and a substantial clearance can be obtained.

Figure 4:
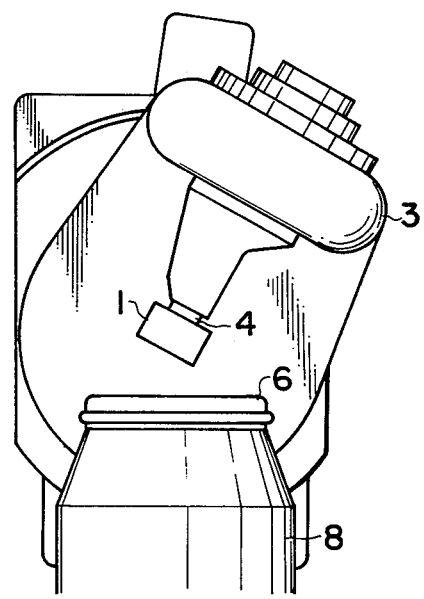
FIG. 4 is a front view of a skiving device provided with an internal spur gear skiving cutter according to one embodiment of the present invention.
Figure 5:
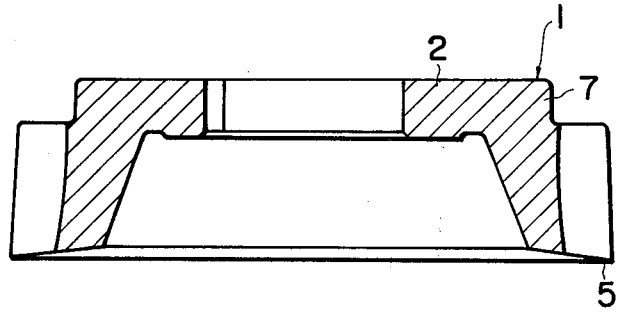
FIG. 5 is a longitudinal sectional view of the device of FIG. 4.
Figure 6:
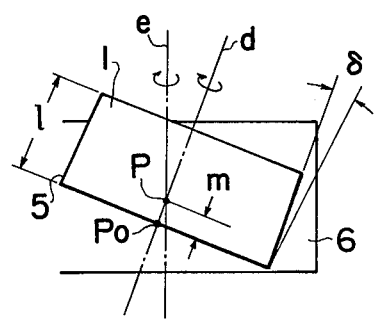
FIG. 6 is an explanatory view of the operation of the device of FIG. 5.

In operation, the work piece 6 to be cut is fixedly secured on a setting jig 8 as shown in FIG. 4 and is rotated in the direction as indicated by the arrow in FIG. 6, whilst the main spindle 4 is rotated in the same direction as that of the work piece 6 to be cut and is then fed upwards and downwards, thereby forming an internal spur gear.

As mentioned in detail hereinabove, the skiving cutter according to the present invention comprises a cutter body 7 adapted to be mounted on a main spindle of a cutter head, said cutter body having cutter blades 5 formed thereon in which the distal end of each of the cutter blades is located at a position offset from the the pitch point P between the cutter and the workpiece to be cut, wherein the contacting point between the cutting blades 5 and the workpiece 6 to be cut is located within a contact or action region L so that the design value $P_o$ of the tooth profile of the cutter may be selected to be near the lower limit of the contact or action region L. Therefore, according to the present invention, it is possible to make the effective width 1 of the cutting blades 5 considerably larger than those of the previous ones thereby increasing the number of regriding the cutter, reducing the cost of tool per one gear to be cut thereby, enabling the side clearance angle $\delta$ to be made smaller, and lessening the difference between the original tooth profile of a new cutter and that of the cutter just before disposal which were ground a number of times, with a high accuracy of the tooth profile of the gear to be formed thereby being ensured.

We claim:

1. A skiving cutter device for use in cutting an internal spur gear, which comprises a cutter head with a main spindle, a cutter body mounted on said main spindle with cutter blades, each cutter blade formed in a gear tooth on said body such that the distal end of each of said cutting blades is located at a position offset from the pitch point between the cutter and a workpiece to be cut located on a support means proximate to said spindle, wherein the contacting point between the respective cutter blades and each gear tooth formed on said workpiece is located within a contacting or acting region defined by the encompassed among interference lines respectively described by the root and the bottom of said each gear tooth formed on the workpiece and an interference line described by the addendum of said each gear tooth-shaped cutter blade of the cutter so that a predetermined design value of the tooth profile of the cutter may be selected to be near the lower limit of said region.

* * * * *